(12) United States Patent
Ganapathiappan et al.

(10) Patent No.: US 9,914,836 B2
(45) Date of Patent: Mar. 13, 2018

(54) COATED SILVER COLORED COLORANT

(71) Applicant: Hewlett-Packard Development Company, L.P., Houston, TX (US)

(72) Inventors: Sivapackia Ganapathiappan, Los Altos, CA (US); Hou T. Ng, Campbell, CA (US); Albert Teishev, Rishon le-zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/122,596

(22) PCT Filed: Apr. 29, 2014

(86) PCT No.: PCT/US2014/035933
§ 371 (c)(1),
(2) Date: Aug. 30, 2016

(87) PCT Pub. No.: WO2015/167473
PCT Pub. Date: Nov. 5, 2015

(65) Prior Publication Data
US 2017/0088714 A1 Mar. 30, 2017

(51) Int. Cl.
*G03G 9/09* (2006.01)
*G03G 9/12* (2006.01)
(Continued)

(52) U.S. Cl.
CPC ............ *C09C 1/644* (2013.01); *B22F 1/0062* (2013.01); *B22F 1/0074* (2013.01); *C09D 11/037* (2013.01); *C09D 11/106* (2013.01); *G03G 9/0902* (2013.01); *G03G 9/122* (2013.01); *G03G 9/125* (2013.01); *G03G 9/131* (2013.01); *B22F 1/0055* (2013.01)

(58) Field of Classification Search
CPC ..... C09C 1/644; C09D 11/106; C09D 11/037; G03G 9/122; G03G 9/131
See application file for complete search history.

(56) References Cited

U.S. PATENT DOCUMENTS 5,944,886 A 8/1999 Hashizume
6,057,384 A 5/2000 Nguyen et al.
(Continued)

FOREIGN PATENT DOCUMENTS

CN 101861366 10/2010
CN 102471423 5/2012
(Continued)

OTHER PUBLICATIONS

International Search Report and Written Opinion for International Application No. PCT/US2014/035933 dated Jan. 15, 2015, 9 pages.

*Primary Examiner* — Thorl Chea
(74) *Attorney, Agent, or Firm* — Dierker & Kavanaugh, P.C.

(57) ABSTRACT

A coated silver colored colorant includes a silver colored pigment, and a primer polymer at least partially coating the silver colored pigment. The primer polymer has a glass transition temperature that is less than 40° C. A passivating polymer is attached to the primer polymer. The passivating polymer has a glass transition temperature that is greater than 40° C.

14 Claims, 4 Drawing Sheets (51) Int. Cl.
  *G03G 9/13* (2006.01)
  *G03G 9/125* (2006.01)
  *C09C 1/64* (2006.01)
  *C09D 11/037* (2014.01)
  *C09D 11/106* (2014.01)
  *B22F 1/00* (2006.01)

(56) References Cited

U.S. PATENT DOCUMENTS

| | | | |
|---|---|---|---|
| 6,413,692 | B1 | 7/2002 | Cheng |
| 6,841,591 | B2 | 1/2005 | Vincent et al. |
| 7,553,883 | B2 | 6/2009 | Yatake et al. |
| 2002/0096088 | A1* | 7/2002 | Bardman ........... C09D 151/003 106/436 |
| 2003/0134940 | A1 | 7/2003 | Morrison et al. |
| 2003/0144376 | A1 | 7/2003 | Vincent et al. |
| 2008/0250971 | A1 | 10/2008 | Ganapathiappan et al. |
| 2008/0269374 | A1 | 10/2008 | Ganapathiappan |
| 2011/0184096 | A1 | 7/2011 | Ganapathiappan et al. |
| 2012/0004345 | A1 | 1/2012 | Chun et al. |
| 2013/0288176 | A1 | 10/2013 | Ganapathiappan et al. |

FOREIGN PATENT DOCUMENTS

| | | |
|---|---|---|
| CN | 102859446 | 1/2013 |
| CN | 103013031 | 4/2013 |
| DE | 4327982 | 2/1995 |
| JP | H06212599 | 8/1994 |
| JP | 2003292851 | 10/2003 |
| WO | WO 2006041658 | 4/2006 |
| WO | WO 2012006047 | 1/2012 |
| WO | WO-2013/062530 | 5/2013 |
| WO | WO 2013149173 | 10/2013 |
| WO | WO 2014012597 | 1/2014 |

* cited by examiner

COATED SILVER COLORED COLORANT

BACKGROUND

Liquid electrophotographic (LEP) printing techniques often utilize printable inks that contain a colorant dispersed in a liquid medium. In some instances, specialty printing applications with orange, violet, green, white, transparent, and silver are used as the LEP printable inks.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in conjunction with other drawings in which they appear.

DETAILED DESCRIPTION

Disclosed herein are a coated silver colored colorant, a metallic base paste, a metallic liquid electrophotographic ink, and method(s) of making a coated silver colored colorant, a metallic base paste, and a printable metallic LEP ink. Examples of the coated silver colored colorant disclosed herein may be used to form examples of the metallic base paste. Examples of the metallic base paste may be used to form examples of the printable metallic LEP ink.

Metallic colored inks may be particularly desirable for specialty printing applications. While many metallic colorants exhibit brilliant color, they also often have high conductivity. It has been found that a high conductivity level may be undesirable for LEP printing, in part because the colorants tend to develop in areas outside of the desired image area. Efforts to reduce the high conductivity may be difficult due to the make-up of the metallic pigment itself, and/or may deleteriously affect the brilliant color.

In the examples disclosed herein, coated silver colored colorants having both a brilliant metallic color and a desirable conductivity for LEP printing are achieved. This is due, in part, to the inclusion of a primer polymer that at least partially coats a silver colored pigment. The primer polymer is transparent, and therefore, the primer polymer does not reduce the brilliance of the silver colored pigment when the primer polymer is at least partially coated thereon. In addition, the primer polymer is capable of attaching a passivating polymer thereto via physical interaction. The attachment of the passivating polymer to the primer polymer passivates the high conductivity of the underlying silver colored pigment.

Along with masking the conductivity of the silver colored pigment, the passivating polymer attaches to the primer polymer in the form of particles ranging in size from about 20 nm to about 10 microns. When incorporated into the final LEP ink, these particles create an active optical spacer between the coated silver colored colorants. This contributes to the colorants maintaining their original brilliant color. In addition, the passivating polymer particles contribute to the coated silver colored colorants remaining discrete and thus not forming large aggregates (i.e., clumps greater than 15 microns) within the metallic LEP inks.

The printable metallic LEP ink disclosed herein, when printed, produces images on a medium (e.g., paper, plastic, etc.) that have a brilliant silver appearance. Without being bound to any theory, it is believed that the brilliant silver appearance of the images is due to the individual coated silver colored colorant particles (which make up all or part of the metallic base paste used to form the printable LEP ink) having a pigment morphology that is conducive to maximum reflectance of light. This is due, in part, to the function of the passivating polymer as an optical spacer. It is believed that this is also due, in part, to the pigment morphology in the coated silver colored colorant being the same as, or substantially similar to the original morphology of the silver colored pigment particles (i.e., the morphology of the pigment particles as they are produced by the manufacturer). As will be discussed further herein, the morphology of the pigment in the coated silver colored colorant is maintained, at least in part, as a result of the method disclosed herein.

Accordingly, examples of the metallic base paste formed from producing the coated silver colored colorants by the method(s) disclosed herein exhibit a desirably sharp, silver metallic color. Examples of printable metallic LEP inks produced from the example metallic base pastes also exhibit a metallic color (e.g., metallic red, metallic blue, metallic green, etc.) having a brilliant, silver shine.

The coated silver colored colorant disclosed herein includes a silver colored pigment. The silver colored pigment may be any pigment having a silver colored appearance. Examples of pigments having a silver colored appearance include those that contain aluminum, such as aluminum pigment particles, encapsulated aluminum pigment particles, aluminum pigment flakes, and aluminum pigment powders. Other examples of pigments having a silver colored appearance include silver pigments, chromium pigments, and platinum pigments. Some metal alloys and metal oxides also exhibit a silver (and, in some instances, pearlescent) appearance. Examples of suitable metal alloys include titanium alloys. Examples of suitable metal oxides include iron oxide, aluminum oxide, mica with or without a titanium dioxide coating, and zinc oxide with a titanium oxide coating. Any combinations of the silver colored pigments disclosed herein may also be used.

It is to be understood that the silver colored pigment may contain organic additives and/or a fatty acid monolayer. These components may be present in, for example, commercially available silver colored pigments.

The coated silver colored colorant also includes a primer polymer at least partially coating the silver colored pigment. In some instances, the primer polymer partially coats the silver colored pigment. For example, the primer polymer coats at least 60% of the surface of the silver colored pigment. In other instances, the primer polymer completely coats the silver colored pigment.

The primer polymer is a homopolymer or copolymer having a glass transition temperature ($T_g$) that is less than or equal to 40° C. Examples of suitable commercially available primer polymers include acrylic styrene emulsion polymers (such as RAYCRYL® 347 or RAYCRYL® 314, which is manufactured by Specialty Polymers, Inc.) or acrylic emulsion polymers (such as RAYCRYL® 61, RAYCRYL® 410, RAYCRYL® 1020, RAYCRYL® 1500, RAYREZ® 1020, or RAYFLEX® 118, all of which are made available by Specialty Polymers, Inc.). In another example, polyurethane can be used as the primer polymer. A specific example of a suitable commercially available polyurethane is an aliphatic waterborne urethane polymer (such as SANCURE® 2026, SANCURE® 2310, SANCURE® 2710, SANCURE® 2036, and SANCURE® AU4010, all of which are made available by Lubrizol Advanced Materials, Inc.).

One example of the primer polymer is a homopolymer formed from one monomer. Some examples of suitable homopolymers include poly(butyl acrylate), poly(butyl methacrylate), poly(hexyl acrylate), poly (2-ethylhexyl acrylate), and poly(2-ethylhexyl methacrylate).

Other examples of the primer polymer include a copolymer formed from two or more different monomers. It is to be understood that the monomers and the weight fraction of those monomers may be selected in accordance with the Fox Equation (discussed below) in order to obtain a copolymer with the desirable $T_g$ of less than or equal to 40° C.

In some examples, the primer polymer is formed from two or three different monomers. In these examples, the first monomer is selected from the group consisting of styrene and methyl methacrylate, and the second monomer is selected from the group consisting of butyl acrylate, 2-ethylhexyl methacrylate, 2-ethylhexyl acrylate, hexyl acrylate, butyl methacrylate, and lauryl methacrylate. When a third monomer is used, it may be selected from the group consisting of methacrylic acid and acrylic acid. As mentioned above, the amounts of the various monomers used may depend upon the $T_g$ of the individual monomer and the desired $T_g$ for the copolymer. In general, in these particular examples, the first monomer is present in an amount ranging from about 10 wt % to about 70 wt % (with respect to the total wt % of the copolymer), and the second monomer is present in an amount ranging from about 30 wt % to about 90 wt % (with respect to the total wt % of the copolymer), and the third monomer is present in an amount ranging from about 0 wt % to about 5 wt % (with respect to the total wt % of the copolymer).

Some specific examples of the primer copolymer made with styrene as one of the monomers will now be described. One example is a copolymer formed from styrene, butyl acrylate, and methacrylic acid, where the styrene is present in an amount ranging from about 50 wt % to about 70 wt %, the butyl acrylate is present in an amount ranging from 30 wt % to about 50 wt %, and the methacrylic acid is present in an amount ranging from about 0 wt % to about 5 wt %. Another example is a copolymer formed from styrene, 2-ethylhexyl methacrylate, and methacrylic acid, where the styrene is present in an amount ranging from about 10 wt % to about 50 wt %, the 2-ethylhexyl methacrylate is present in an amount ranging from about 50 wt % to about 90 wt %, and the methacrylic acid is present in an amount ranging from about 0 wt % to about 5 wt %. Yet another example is a copolymer formed from styrene, hexyl acrylate, and methacrylic acid, where the styrene is present in an amount ranging from about 10 wt % to about 70 wt %, the hexyl acrylate is present in an amount ranging from 30 wt % to about 90 wt %, and the methacrylic acid present in an amount ranging from about 0 wt % to about 5 wt %. Still another example is a copolymer formed from styrene, butyl acrylate, and methacrylic acid, where the styrene is present in an amount ranging from about 10 wt % to about 30 wt %, the butyl acrylate is present in an amount ranging from 70 wt % to about 90 wt %, and the methacrylic acid present in an amount ranging from about 0 wt % to about 5 wt %. A further example of a suitable copolymer is formed from styrene, lauryl methacrylate, and methacrylic acid, where the styrene is present in an amount ranging from about 10 wt % to about 70 wt %, the lauryl methacrylate is present in an amount ranging from 30 wt % to about 90 wt %, and the methacrylic acid present in an amount ranging from about 0 wt % to about 5 wt %.

Some specific examples of the primer copolymer made with methyl methacrylate as one of the monomers will now be described. One example is a copolymer formed from methyl methacrylate, lauryl methacrylate, and methacrylic acid, where the methyl methacrylate is present in an amount ranging from about 10 wt % to about 70 wt %, the lauryl methacrylate is present in an amount ranging from 30 wt % to about 90 wt %, and the methacrylic acid is present in an amount ranging from about 0 wt % to about 5 wt %. Another example of the copolymer is formed from methyl methacrylate, hexyl acrylate, and methacrylic acid, where the methyl methacrylate is present in an amount ranging from about 10 wt % to about 70 wt %, the hexyl methacrylate is present in an amount ranging from 30 wt % to about 90 wt %, and the methacrylic acid is present in an amount ranging from about 0 wt % to about 5 wt %. Still another example of the copolymer is formed from methyl methacrylate, butyl methacrylate, methacrylic acid, where the methyl methacrylate is present in an amount ranging from about 10 wt % to about 70 wt %, the butyl methacrylate is present in an amount ranging from about 30 wt % to about 90 wt %, and the methacrylic acid is present in an amount ranging from about 0 wt % to about 5 wt %. Yet another example of the copolymer is formed from methyl methacrylate, butyl acrylate, and methacrylic acid, where the methyl methacrylate is present in an amount ranging from about 10 wt % to about 30 wt %, the butyl acrylate is present in an amount ranging from about 70 wt % to about 90 wt %, and the methacrylic acid is present in an amount ranging from about 0 wt % to about 5 wt %. In still another example, the copolymer is formed from methyl methacrylate, 2-ethylhexyl methacrylate, and methacrylic acid, where the methyl methacrylate is present in an amount ranging from about 10 wt % to about 50 wt %, the 2-ethylhexyl methacrylate is present in an amount ranging from about 50 wt % to about 90 wt %, and the methacrylic acid is present in an amount ranging from about 0 wt % to about 5 wt %.

In all of the above examples, 2-ethylhexyl methacrylate can be replaced with 2-ethylhexyl acrylate. In addition, in all the above examples, methacrylic acid can be replaced with acrylic acid.

The coated silver colored colorant further includes a passivating polymer, which is attached to the primer polymer. The passivating polymer adheres to the silver colored colorant by attaching to the primer polymer through physical interaction (i.e., physical bonding). In some instances, the passivating polymer at least partially coats the silver colored pigment. In other instances, the passivating polymer completely coats the silver colored pigment.

The passivating polymer is a homopolymer or copolymer having a glass transition temperature greater than 40° C.

Examples of suitable commercially available passivating polymers include styrene acrylic emulsion polymers (such as RAYREZ® 182A and RAYREZ® 182D made available by Specialty Polymers, Inc.) or acrylic emulsion polymers (such as RAYREZ® 200 and RAYKOTE 1589 made available by Specialty Polymers, Inc.).

One example of the passivating polymer is a homopolymer formed from one monomer. Some examples of suitable passivating homopolymers are polystyrene, poly(4-methylstyrene), or polymethyl methacrylate.

In other examples, the passivating polymer may be a copolymer. In some examples, the passivating copolymer may be desirable, in part, because of its film forming properties and charging characteristics. In an example, the passivating polymer may be a copolymer formed from styrene present in an amount ranging from about 25 wt % to about 60 wt %, methyl methacrylate present in an amount ranging from about 25 wt % to about 60 wt %, butyl acrylate present in an amount of about 13 wt %, and methacrylic acid present in an amount of about 2 wt %. In a specific example, styrene is present in an amount of about 25 wt % and methyl methacrylate is present in an amount of about 60 wt %. In another example, styrene is present in an amount of about 40 wt % and methyl methacrylate is present in an amount of about 45 wt %. In yet another example, styrene is present in an amount of about 60 wt % and methyl methacrylate is present in an amount of about 25 wt %.

As mentioned above, if more than one monomer is used to produce the primer copolymer or the passivating copolymer (e.g., a mixture of styrene, methyl methacrylate, butyl acrylate, and methacrylic acid), then the $T_g$ of the polymerized product (i.e., copolymer) may be estimated using the Fox equation (Equation 1 below). The Fox equation may be used to relate the molecular weight of a copolymer system to the glass transition temperature:

$$\frac{1}{T_g} = \frac{w_1}{T_{g1}} + \frac{w_2}{T_{g2}} + \ldots \frac{w_x}{T_{gx}} \quad \text{(Equation 1)}$$

In Equation 1, $w_1$, $w_2$ and $w_x$ are the weight fractions of copolymer components (i.e., monomers) 1, 2, up to monomer x, respectively, and $T_{g1}$, $T_{g2}$, and $T_{gx}$ are the glass transitions temperatures of the copolymer components (i.e., monomers) 1, 2, up to monomer x, respectively. Generally, the $T_g$ of the copolymer is affected by the $T_g$ of the monomers in the copolymer system. In an example, the same monomers may be used to form the primer copolymer and the passivating copolymer, but an increased weight percentage of the monomer(s) with a higher glass transition temperature will be present in the passivating copolymer as compared to the primer copolymer.

The coated silver colored colorant particle maintains its original morphology after the primer polymer and passivating polymer are attached. For instance, if the original morphology of the particles resembles flat rods or fibers, then after adding the primer polymer and passivating polymer, the morphology of the pigment should still resemble flat rods or fibers. As another example, when the silver colored pigment includes aluminum pigment particles (e.g., silver dollar aluminum pigments), the morphology of the particles have a flat and round morphology, resembling a "silver dollar", which is maintained throughout processing. The coated silver colored colorant particles' original length ranges from about 5 µm to about 10 µm. The length remains substantially the same after the primer polymer and passivating polymer are attached. The coated silver colored colorant has an increased thickness with respect to an original thickness of the silver colored pigment. This is due, in part, to the addition of the primer polymer and the passivating polymer on the surface of the silver colored pigment. The thickness of the coated silver colored colorant particle may range from about 50 nm to about 200 nm, depending, in part, on the size of the original silver colored pigment particle.

Moreover, the primer polymer and passivating polymer at least partially coating the silver colored colorant particle(s) enhance the durability of the resulting coated silver colored colorant. The primer polymer and passivating polymer form a protective coating on the pigment particles. It is believed that the encapsulation of the silver colored pigment particle(s) contributes to protecting the particle(s) from breaking down during subsequent production of the metallic base paste or the printable metallic LEP inks or during the subsequent printing of the metallic LEP inks. Thus, it is believed that the protective coating contributes to the silver colored pigment particle(s) maintaining their morphology throughout manufacturing and printing.

Figure 1:
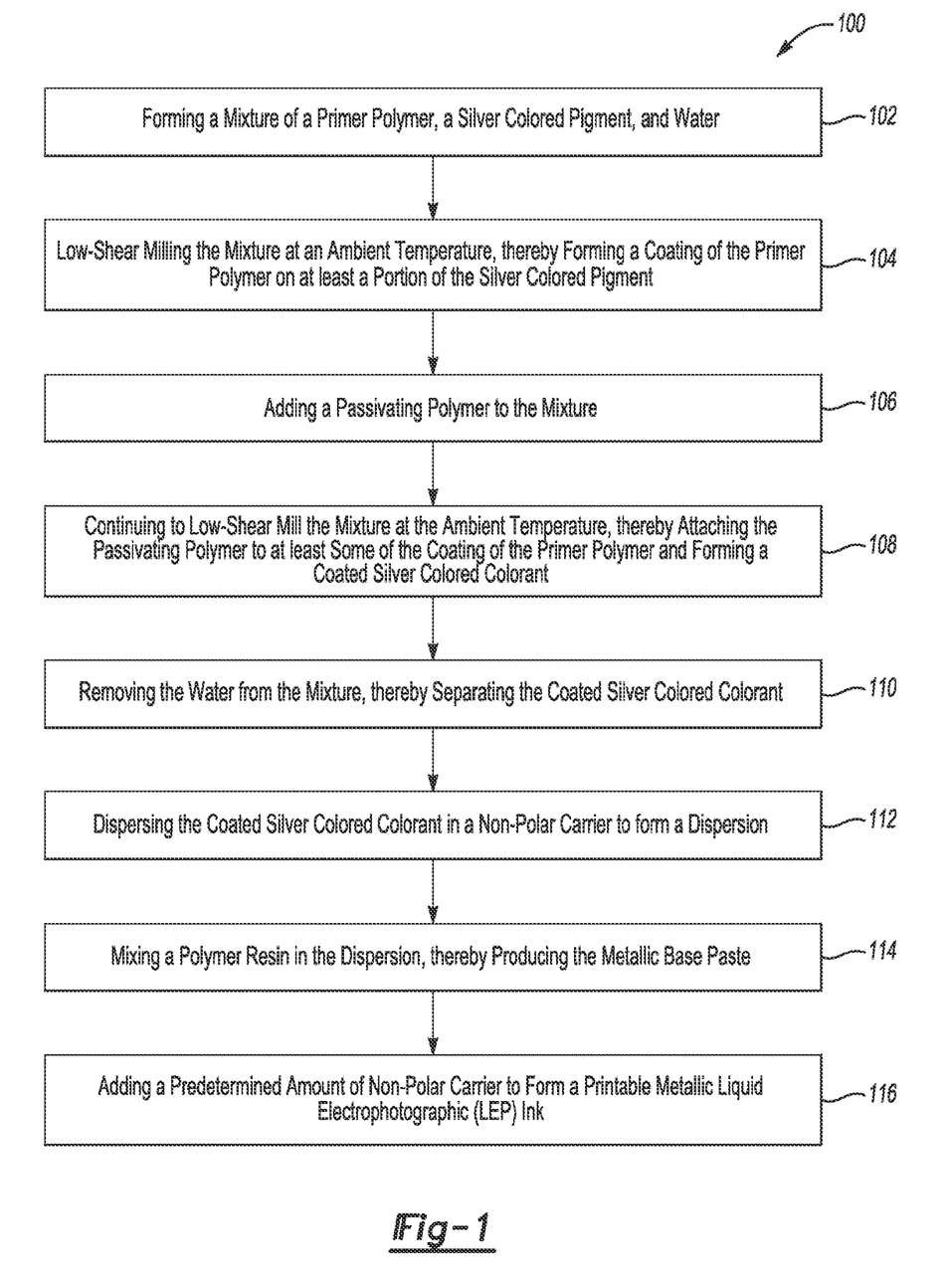
FIG. 1 is a flow diagram depicting an example of a method of making a printable metallic LEP ink.

The final coated silver colored colorant particle(s) may be processed into a metallic base paste, which is described below in reference to the method and FIG. 1. Suitable materials for the metallic base paste will now be described.

Generally, the metallic base paste includes a non-polar carrier, the coated silver colored colorant particle(s) (which include the components mentioned above), and a polymer resin.

The coated silver colored colorant particle(s) are dispersed in the non-polar carrier. The non-polar carrier for the metallic base paste is a hydrocarbon, examples of which include isoparaffinic hydrocarbons, paraffinic hydrocarbons, aliphatic hydrocarbons, de-aromatized hydrocarbons, halogenated hydrocarbons, cyclic hydrocarbons, functionalized hydrocarbons, and combinations thereof. Functionalized hydrocarbons include hydrocarbons functionalized with alcohols, esters, ethers, sulfonic acid esters, etc. The hydrocarbon may be an aliphatic hydrocarbon, an isomerized aliphatic hydrocarbon, branched chain aliphatic hydrocarbons, aromatic hydrocarbons, and combinations thereof.

Some examples of the non-polar carrier include ISOPAR® G, ISOPAR® H, ISOPAR® K, ISOPAR® L, ISOPAR® M, ISOPAR® V, NORPAR® 12, NORPAR® 13, NORPAR® 15, EXXOL® D40, EXXOL® D80, EXXOL® D100, EXXOL® D130, and EXXOL® D140, all of which are available from Exxon-Mobil Corp., Houston, Tex.

Further examples of the non-polar carrier include TECLEN® N-16, TECLEN® N-20, TECLEN® N-22, NISSEKI NAPHTHESOL® L, NISSEKI NAPHTHESOL® M, NISSEKI NAPHTHESOL® H, Solvent H, Solvent L, Solvent M, NISSEKI ISOSOL® 300, NISSEKI ISOSOL® 400, AF-4, AF-5, AF-6, and AF-7 (all of which are available from Nippon Oil Corp., Tokyo, JP); IP Solvent 1620 and IP Solvent 2028 (both of which are available from Idemitsu Petrochemical Co., Ltd., Tokyo, JP); AMSCO® OMS and AMSCO® 460 (both of which are available from American Mineral Spirits Co., Los Angeles, Calif.); and Electron, Positron, New II, and Purogen HF (all of which are available from Ecolink Co., Tucker, Ga.).

The metallic base paste also contains the polymer resin, which attaches to the coated silver colored colorant particles during processing. Specifically, the polymer resin may attach to any exposed primer polymer (i.e., that does not have the passivating polymer attached thereto) and/or the passivating polymer. The polymer resin attaches to the primer polymer and passivating polymer through physical interaction (e.g., adsorption). When the polymer resin attaches to the silver colored colorant particle(s), it helps disperse the coated silver colored colorant particles in the dispersion of the metallic base paste.

The polymer resin may be a transparent resin. In an example, the transparent resin is a thermoplastic resin, such as polyethylene. Other examples of suitable resins include ethyl vinyl acetate copolymers (such as those of the ELVAX® family available from E.I. du Pont de Nemours & Co.), ethylene copolymers having a carboxylic acid functionality (such as those of the ELVAX II® family available from E.I. du Pont de Nemours & Co., examples of which include ELVAX II 5720 and ELVAX II 5610), polybutyl terephthalate, ethylene ethyl acrylate (such as those of the BAKELITE® family, available from Union Carbide, examples of which include DPD 6169, DPDA 6182 Natural, and DTDA 9169), ethylene vinyl acetate (such as DQDA 6479 Natural 7 and DQDA 6832 Natural 7), and methacrylate resins (such as those of the ELVACITE® family, including polybutyl methacrylate (Grade 2044), polymethyl methacrylate (Grade 2028), and polymethyl methacrylate (Grade 2041) available from E.I du Pont de Nemours & Co.).

Although the polymer resin is adsorbed onto the primer polymer and/or passivation polymer, the original morphology of the silver colored pigment is maintained through the production of the metallic paste. In other words, the original pigment morphology is maintained even after the interaction of the coated silver colored colorant with the polymer resin(s).

In an example, the metallic base paste may also contain a dispersant. The dispersant is present in an amount ranging from about 0 wt % to about 20 wt % of the total wt % of the metallic base paste. An example of a dispersant is OS#199431E (made available by Lubrizol Advanced Materials, Inc.).

It is to be understood that the total amount of non-volatile solids (NVS) in the metallic base paste ranges from about 20 wt % to about 75 wt %. The amount of coated silver colored colorant, polymer resin, and non-polar carrier may be adjusted in order to achieve the desired NVS. Some example amounts will be described below in reference to FIG. 1.

The printable metallic liquid electrophotographic (LEP) ink will now be described. In order to produce the printable metallic LEP ink, the metallic base paste is diluted with additional non-polar carrier. The additional non-polar carrier is added in an amount sufficient to dilute the metallic base paste to form a metallic LEP ink having a non-volatile solids (NVS) content ranging from about 0.1 wt % to about 4 wt %. The printable metallic LEP ink also contains a charge director, which is added during the mixing of the metallic base paste with additional non-polar carrier. The charge director is added to the metallic ink to induce a charge to the coated silver colored colorant particle(s), and may be chosen from one or more charging agents.

Examples of charge directors that may be used include metal salts having polyvalent metal ions and organic anions as the counterion. Suitable metal ions include Ba, Ca, Mn, Zr, Cu, Al, Cr, Fe, Sb, Co, La, Pb, Mg, Mo, Ni, Ag, Sr, Sn, V, Y, and Ti. Suitable organic anions include carboxylates or sulfonates derived from aliphatic or aromatic carboxylic or sulfonic acids (such as aliphatic fatty acids including stearic acid, behenic acid, neodecanoic acid, diisopropylsalicylic acid, octanoic acid, abietic acid, naphthenic acid, octanoic acid, lauric acid, tallic acid, and the like). Positive charge directors may include metallic carboxylates, which include alkaline earth-metallic salts and heavy-metallic salts of fatty acids containing at least 6 to 7 carbons, and cyclic aliphatic acids including naphthenic acid.

The metallic LEP ink may further include an additive, such as a slipping agent and/or a fatty acid. Examples of slipping agents include fatty acid amine esters such as erucamide, CRODAMIDE® (Croda International PLC, Edison, N.J.), ARGUSLIP® (Argus Additive Plastics GmbH, Buren, Germany), metal soaps such as aluminum stearates, silicon oils, waxes, paraffin oils, and glycols. Some fatty acids may have lubricating characteristics, and may be used in the ink formulation to modulate DC conductivity.

In an example, the metallic LEP ink has the silver colored pigment present in an amount ranging from about 20 wt % to about 50 wt % of a total wt % of the coated silver colored colorant that is included. The primer polymer is present in the LEP ink in an amount ranging from about 3 wt % to about 20 wt % of the total wt % percent of the silver colored pigment. The passivation polymer is present in the LEP ink in an amount ranging from about 30 wt % to about 100 wt % of the total wt % of the silver colored pigment. The polymer resin in the LEP ink is present in an amount ranging from about 40 wt % to about 60 wt % of the total wt % of the coated silver colored colorant.

An example of a method 100 of making an example of the coated silver colored colorant, an example of the metallic base paste, and an example of the metallic LEP ink will now be described herein with reference to FIG. 1.

In the method 100, the coated silver colored colorant is formed, and then the metallic base paste is formed. The metallic base paste may then be diluted to form the printable metallic LEP ink.

In step 102, a mixture is formed of the primer polymer, the silver colored pigment, and water. A predetermined weight ratio of the primer polymer, silver colored pigment, and water is used to form the mixture. In an example, the weight ratio of the primer polymer:the silver colored pigment:water is about 11:about 2:about 87.

In step 104, the mixture is homogenized. In an example, the homogenization involves low-shear milling of the mixture at an ambient temperature, which forms a coating of the primer polymer on at least a portion of the silver colored pigment. It is to be understood that the ambient temperature is a temperature ranging from about 15° C. to about 30° C.

The low sheer milling process is defined as a process where agitation of the mixture is accomplishing using a gentle shaking process occurring at a low agitation frequency of less than or equal to 1 kHz. The low agitation frequency may be as low as 1 Hz (0.001 kHz). Alternatively, the low agitation frequency may be about 100 RPM. The agitation process disclosed herein is unlike high shearing processes, such as microfluidization, that tend to break down the pigment and change its morphology when performed in the presence of a resin. The gentleness of the milling process is also accomplished by performing the shaking utilizing equipment where no moving parts physically contact the particles. In this way, the agitation process is a non-impact process.

In an example, agitation of the mixture may be accomplished by shaking the mixture, such as by pivotal shaking, orbital shaking, rotational shaking, pneumatic shaking, or combinations thereof. Shaking may be accomplished, for instance, by grasping the container containing the mixture by a person's hand, and then moving the container (in a non-violent manner that coincides with a shaking frequency of less than or equal to 1 kHz or 100 RPM) from side to side, from front to back, in circles, etc. to perform the homogenization of the mixture. In another example, the container may be placed on an agitator set to a low frequency (again, less than or equal to 1 kHz or 100 RPM), and the mixture may be homogenized by the agitator.

It is to be understood that homogenization is accomplished by agitation alone. In other words, no other processing steps are used to homogenize the mixture. Completion of homogenization of the mixture may be determined by visual inspection. Visual inspection may be accomplished while watching the mixture mix during the shaking/agitating through a transparent container, or by stopping the shaking/agitating periodically and opening the container.

In step 106, during the low-shear milling, a passivating polymer is added to the mixture. The low-shear mixing process is continued in step 108 at the ambient temperature (as defined above). After the mixture is sufficiently homogenized, the passivating polymer is attached to at least some of the coating of the primer polymer, which forms the coated silver colored colorant particles.

The low-shear milling process used in steps 104 and 108 is believed to aid in the pigment morphology being maintained, even when the primer polymer and the passivating polymer are coated on the silver colored pigment. The method 100 allows for the primer polymer to at least partially coat the silver colored pigment(s) and the passivating polymer to attach to the primer polymer under mild stirring conditions, which keeps the silver colored pigment(s) dispersed, without subjecting the silver colored pigment(s) to a high-shear milling process that causes pigment break down (i.e., alteration of the morphology). As such, the low-shear milling process enables the coating process as well as allowing the silver colored pigment(s) to maintain the original morphology.

In step 110, the water is removed from the mixture at the ambient temperature (as defined above) in order to separate the coated silver colored colorant. In one example, the water may be removed by allowing the mixture to air dry at the ambient temperature or under forced air conditions.

The coated silver colored colorant is then dispersed in the non-polar carrier to form a dispersion, as shown in step 112. The dispersion may be formed, e.g., in a container, by dispersing the coated silver colored colorant in the non-polar carrier.

Step 114 involves mixing the polymer resin into the dispersion to produce a metallic base paste. The polymer resin may be added to the dispersion formed in step 112 and mixing is continued. Mixing may be performed using the low-shear milling process described herein. It is to be understood that the dispersion formed at step 112 is a paste, and not a fluidic liquid. As used herein, a paste refers to a material having a soft and malleable consistency. The metallic base paste has a non-volatile solids content ranging from about 20 wt % to about 75 wt %.

The metallic base paste is mixed for a period of time that is relative to the total amount of non-volatile solids (NVS) present in the metallic base paste. In an example, the total amount of NVS in the metallic base paste ranges from about 20 wt % to about 75 wt % of the LEP paste. In another example, the amount of NVS ranges from about 25 wt % to about 55 wt % of the metallic base paste. In yet another example, the NVS of the metallic base paste ranges from about 30 wt % to about 45 wt %. The mixing should take place for about 40 minutes per kilogram of the metallic base paste. It is to be understood that the mixing time may be reduced when the total NVS is lower, and thus the metallic base paste is thinner. For example, the mixing time may be reduced to about 20 minutes per kilogram of the metallic base paste when the metallic base paste includes about 23 wt % NVS.

To achieve the brilliant, metallic appearance, the coated silver colored colorant should lie in a plane parallel/substantially parallel to a surface upon which it is applied (i.e., as a component of metallic base paste, or of the LEP printable ink). In an example, the coated silver colored colorant lies in a plane parallel/substantially parallel when the plane is no more than 20 degrees from the surface upon which the example metallic base paste is established/printed. It is believed that the orientation of the pigment in this manner may be achieved when the coated silver colored colorant retains its original morphology during the processing of the metallic base paste, as well as during the processing of other LEP pastes utilizing the metallic base paste.

Additionally, for silver colored pigments that tend to have random and/or irregular morphologies, the original morphology of the pigment may be retained, e.g., by maintaining a particle size distribution and/or a particle thickness distribution during processing. It is believed that maintaining the morphology in this manner may contribute to the brilliance of the metallic color of a printed metallic LEP ink including an example of the metallic base paste as a component thereof. In yet another example, retention of the morphology (i.e., the morphology of the pigment is the same as, or substantially similar to the original morphology of the pigment particles before processing) may also be accomplished when the change in a baseline value (e.g., diameter, longitudinal width, width, etc.) before and after processing is less than a standard deviation of 2. For example, if a baseline diameter is about 10 µm, a reduction in the diameter ranging anywhere from 7 µm to about 10 µm is acceptable. In this example, a longitudinal length reduction from 20 µm to 10 µm may also be acceptable. It is believed that for this example, the brilliance should be retained because the final diameter is more than 7 µm, the surface area is greater than 100 µm$^2$, and the surface roughness (Ra) is less than 5 µm.

Referring back to FIG. 1, in step 116, a predetermined amount of non-polar carrier is added to the metallic base paste to form the printable metallic LEP ink. The amount of non-polar carrier added is sufficient to render the metallic LEP ink having a non-volatile solids content ranging from about 0.1 wt % to about 4 wt %.

The additional non-polar carrier may be added to the metallic base paste whenever it is desirable to form the ink. In an example, the additional non-polar carrier may be added directly to the metallic base paste and subjected to low-shear milling. In another example, the paste may be diluted in an LEP printing system.

During ink formation, it is believed that the polymer resin may become further adsorbed onto the exposed primer polymer and/or the passivation polymer.

The examples of the metallic LEP ink (including the metallic base paste) produced by the examples of the method disclosed herein are printable by a digital printing system (e.g., digital printing presses).

Figure 2:
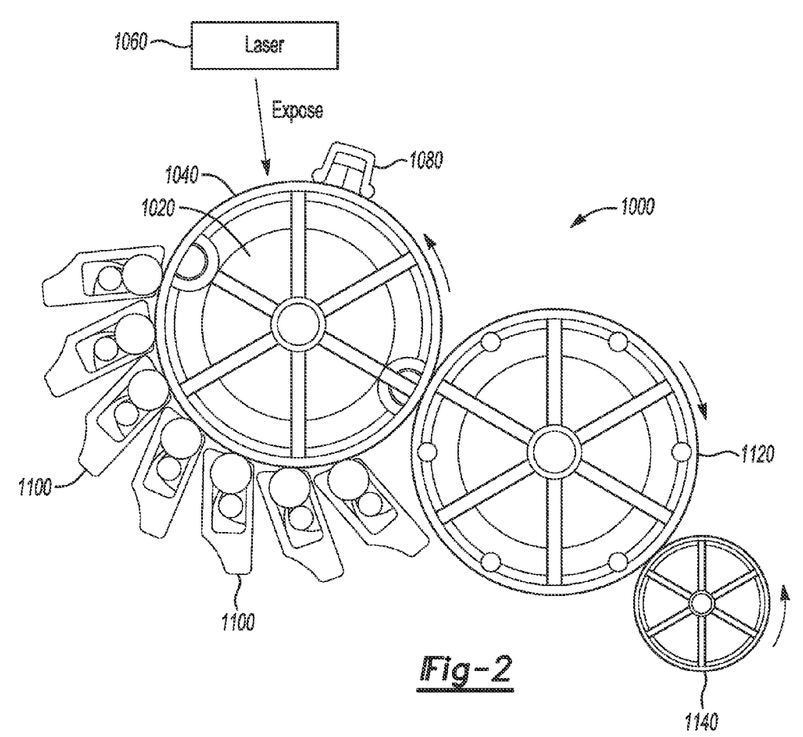
FIG. 2 is an example of a liquid electrophotographic (LEP) printing system for printing examples of the printable LEP ink of the present disclosure.

An example of an LEP printing system 1000 is shown in FIG. 2. The system 1000 includes a photoconductor/photo imaging plate (PIP) 1040 that is mounted to a rotating drum 1020. The photoconductor/PIP 1040 includes a surface that may be exposed to various elements of the system 1000 when the photoconductor/PIP 1040 is rotated.

The system 1000 further includes laser 1060 and a corona generator 1080, both of which are positioned adjacent to the surface of the photoconductor/PIP 1040. The laser 1060 is positioned such that as the drum 1020 rotates in the first direction, some of the areas of the photoconductor/PIP 1040 exposed to corona discharge from the generator 1080 are exposed to the emission from the laser 1060. The laser 1060 is selected so that its emission can generate charges opposite to those already present on the surface of the photoconductor/PIP 1040. By virtue of creating opposite charges, the laser 1060 effectively neutralizes the previously formed charges at areas exposed to the laser emission. This neutralization forms a latent image. It is to be understood that those areas of the surface of photoconductor/PIP 1040 not exposed to the laser remain charged.

A processor (not shown) operatively connected to the laser 1060 commands the laser 1060 to form the latent image so that the remaining charged portions of the surface of the photoconductor/PIP 1040 can be used to generate the desirable digital image. The processor is capable of running suitable software routines or programs (stored on computer readable media) for receiving desirable digital images, and generating commands for the corona generator 1080, binary ink developers (BIDs) 1100, and various components of the system 1000 including the photoconductor/PIP 1040, an intermediate transfer blanket 1120, an impression cylinder 1140, etc.

The system 1000 shown in FIG. 2 further includes at least one BID 1100 that is fluidically connected to an ink tank (not shown). The ink tank may include three chambers, one chamber to hold an example of the metallic base paste (which was already formed offboard the system 1000), another chamber to hold the non-polar carrier, and still another chamber for mixing the metallic base paste and non-polar carrier to generate a printable metallic LEP ink (having the desirable NVS). In an example, the metallic base paste in the chamber may be selected to include coated silver colored colorants carrying a charge that is opposite to that of the charged photoconductor/PIP 1040. In another example, the metallic base paste in the chamber may be uncharged, and the non-polar carrier may include a charge director that will introduce charge to the coated silver colored colorants once the printable metallic LEP ink is formed in the mixing chamber.

A roller in each of the BIDs 1100 is used to deposit a uniform layer of the printable metallic LEP ink (i.e., the metallic base paste diluted with the non-polar carrier) onto charged portions of the surface of the photoconductor/PIP 1040 during image development. It is to be understood that the charges remaining on the surface of the photoconductor/PIP 1040 after exposure to the laser will attract the oppositely charged metallic LEP ink(s).

The ink is then transferred from the photoconductor/PIP 1040 to the intermediate transfer blanket 1120, and then a substrate/hardcopy material (e.g., paper or other print substrate) is brought directly into contact with the intermediate transfer blanket 1120 via the impression cylinder 1140, in order to transfer the image. The printable metallic LEP inks disclosed herein may be printed on a variety of substrates (e.g., plain paper, coated paper, polyethylene terephthalate (PET) transparencies, label stocks, synthetic paper, etc.).

In instances where the metallic LEP ink includes the coated silver colored colorants, the ink layer formed on the substrate may have any desirable thickness and still have a brilliant silver colored appearance. In instances where the metallic LEP ink includes a combination of a colorant exhibiting a silver appearance and a pigment exhibiting a pearlescent optical property, the ink layer formed on the medium should be relatively thin, e.g., a thickness of 1 μm or less, so that the ink film will have both the brilliant silver colored appearance as well as the pearlescent appearance.

To further illustrate the present disclosure, examples are given herein. It is to be understood that these examples are provided for illustrative purposes and are not to be construed as limiting the scope of the present disclosure.

EXAMPLES

Four samples and three comparative samples of printable metallic LEP inks were prepared and the compositions are shown in Table 1 below.

In all of the samples and comparative sample, metallic aluminum pigment flakes 7 μm in length were used.

A styrene/methyl methacrylate/butyl acrylate/methacrylic acid (Sty/MMA/BA/MA) copolymer was used as the passivation polymer in all the samples and two of the comparative samples (one comparative sample did not include any passivation polymer). This copolymer was prepared as a latex solution in water. Styrene (Sty) was present in an amount of 25 wt %, methyl methacrylate (MMA) was present in an amount of 60 wt %, butyl acrylate (BA) was present in an amount of 13 wt %, and methacrylic acid (MA) was present in an amount of 2 wt %. The monomers Sty (50 g), MMA (120 g), BA (26 g) and MA (4 g) were mixed together. The mixture was emulsified with the surfactant MAXEMUL™ 6106 (1.6 g, from Croda Int.) in water (68 g). Water (367 g) was heated to 80° C. and the initiator potassium persulfate (KPS) (0.139 g) was added. Then, a solution of KPS (0.556 g) in water (30 ml) and the emulsion were added to the hot water simultaneously over a period of 1 hour 45 minutes. Heating was continued for another 2 hours and cooled to ambient temperature to obtain the passivation copolymer latex solution with a solid content of 27.75%.

A polyurethane primer, SANCURE® 2036, was used as the primer polymer in sample 3. An acrylic primer, RAYCRYL® 314 was used as the primer polymer in samples 4-6. In comparative sample 1 and 2, SANCURE® AU4010 was used as a polyurethane primer. Comparative sample 0 did not include any primer polymer. The non-polar carrier was ISOPAR® L.

The process for preparing Sample 5 is described below and other examples were carried out by following similar procedure using the appropriate components and amounts mentioned in Table 1. Aluminum pigment flakes (20 g) in 50 grams of water was mixed to form a mixture. The mixture was added to an S-0 attritor along with 900 grams of 2 mm Yttria ceramic beads to homogenize the mixture using low-shear (70 RPM) milling. Acrylic primer polymer (4.26 g) was added to the mixture. Once the low-shear milling had begun, the Sty/MMA/BA/MA passivating polymer (43.2 g) was added to the mixture. The mixture was homogenized by low-shear milling at about 70 RPM at an ambient temperature of about 20° C. for about 2 hours. More water (66 g) was added to reduce the viscosity of the solution during milling. Then, the contents were taken out and water was removed by letting the mixture air dry at the ambient temperature. The mixture was then introduced into the S-0 attritor again, and was mixed with ISOPAR® L (71 g).

A polyethylene (PE) resin paste in ISOPAR® L (32 g, supplied by HP Indigo, the paste has a 25% solid content)) and an aluminum stearate charge director (CD) (80 mg) were added to the mixture, and the mixture was milled at 125 RPM for 30 min. More PE resin paste (53.44 g), CD (0.134 g) and ISOPAR® L (28 g) were added, and milling was continued at 45° C. for 10 hours. The product was cooled to ambient temperature, and the content of the final printable LEP ink was collected from the ceramic beads by diluting with ISOPAR® L.

The other samples and comparative samples were formed in a similar manner, except that different shearing processes and conditions may have been used (see Table 2) and the components and amounts were varied as shown in Table 1. It is to be understood that the amount (in grams) of each component used was varied to achieve the wt % shown. The balance of each sample was ISOPAR® L.

TABLE 1

| Sample | Silver Colored pigment (wt %*) | Polyurethane primer and wt %* | Acrylic primer polymer and wt %* | Sty/MMA/BA/MA Passivation polymer (wt %*) | PE resin paste (wt %*) | CD (wt %) |
|---|---|---|---|---|---|---|
| Comparative Sample 0 | 35 | 0 | 0 | 21 | 44 | 0.38 |
| Comparative Sample 1 | 35 | SANCURE ® AU4010 21 | 0 | 0 | 44 | 0.38 |
| Comparative Sample 2 | 35 | SANCURE ® AU4010 10.5 | 0 | 10.5 | 44 | 0.38 |
| Sample 3 | 35 | SANCURE ® 2036 3.5 | 0 | 21 | 40.5 | 0.38 |
| Sample 4 | 35 | 0 | RAYCRYL ® 314 3.5 | 21 | 40.5 | 0.38 |
| Sample 5 | 35 | 0 | RAYCRYL ® 314 3.5 | 21 | 40.5 | 0.38 |
| Sample 6 | 35 | 0 | RAYCRYL ® 314 3.5 | 28 | 33.5 | 0.38 |

*with respect to the total percentage of coated silver colored colorants

Figure 3:
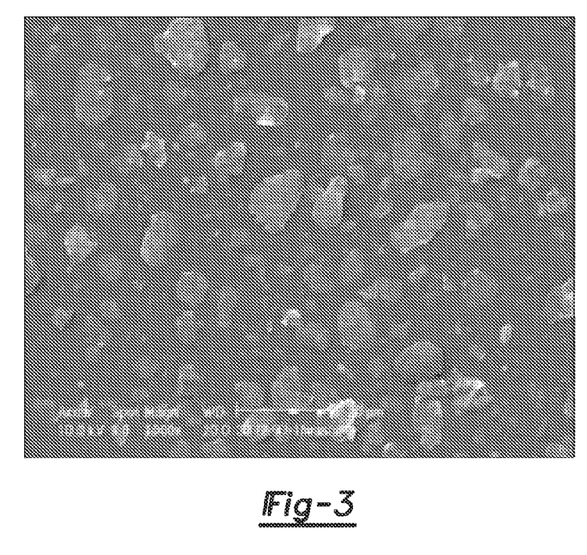
FIG. 3 is a scanning electron micrograph (SEM) of an example of a bare silver colored colorant used in the EXAMPLES section of the instant application.
Figure 5:
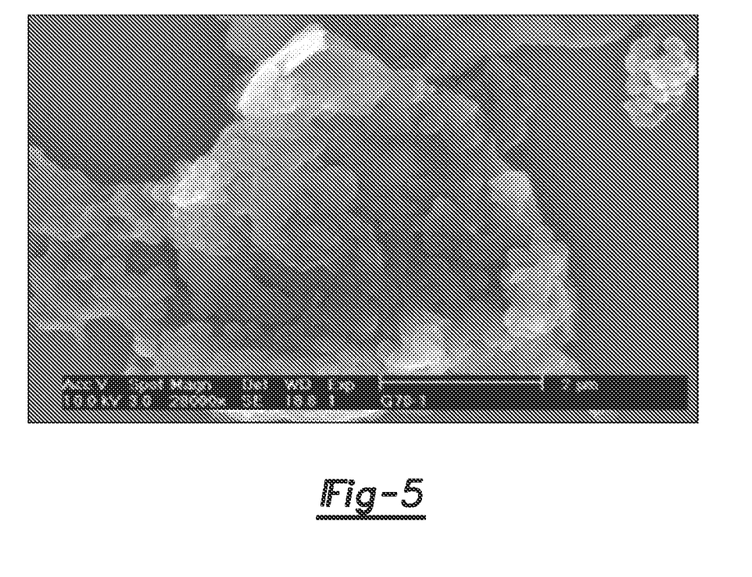
FIG. 5 is a scanning electron micrograph (SEM) of an example of coated silver colored colorants disclosed herein.
Figure 6A:
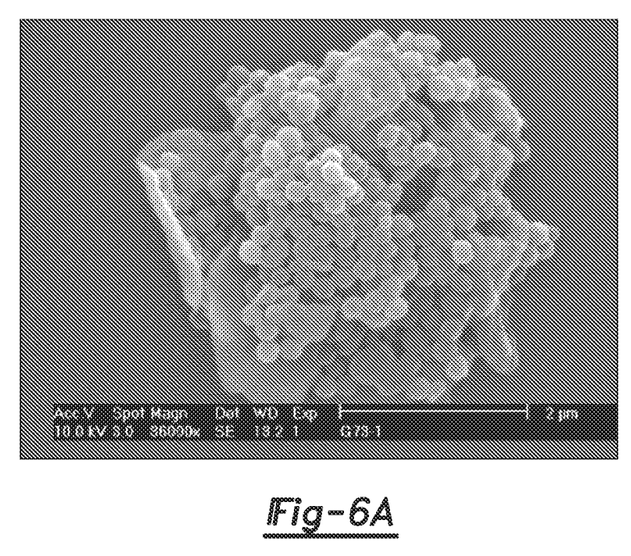
FIGS. 6A and 6B are scanning electron micrographs (SEM) of another example of coated silver colored colorants disclosed herein.
Figure 6B:
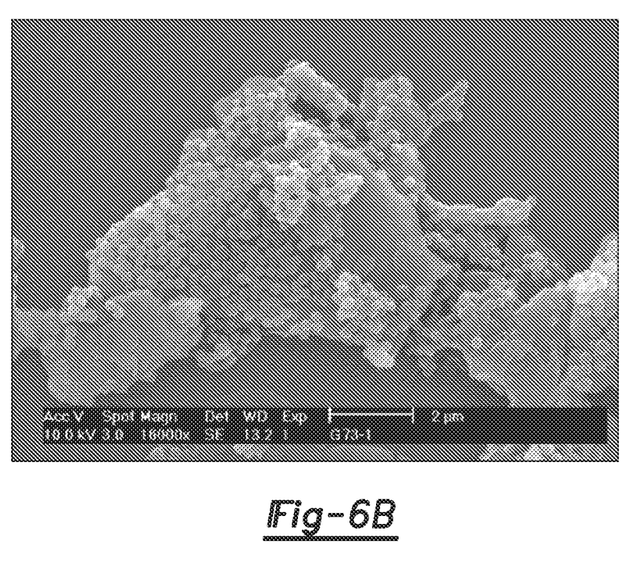

A SEM image of the aluminum pigment flakes prior to being coated is shown in FIG. 3. These bare aluminum pigment flakes were used as the silver colored pigment in all samples and comparative samples in Table 1. In addition, SEM images of the coated silver colored colorants of Sample 5 and Sample 6 were taken. These are respectively shown in FIGS. 5 and 6A-6B. When FIG. 3 (bare pigment) is compared to FIGS. 5 and 6A-6B (coated with primer and passivation polymers), it is clear that the silver dollar morphology of the aluminum pigment flakes is maintained after the aluminum pigment flakes have been coated. Furthermore, FIGS. 5 and 6A-6B clearly illustrate the attachment of the passivation polymer on the surface of the silver colored pigments. It is noted that the primer polymer is not readily visible due to its transparency and the presence of the passivation polymer.

Figure 4:
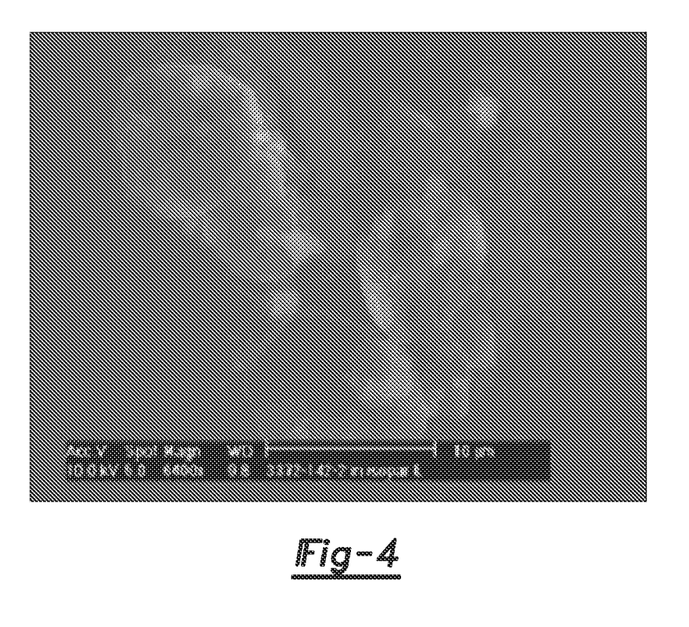
FIG. 4 is a scanning electron micrograph (SEM) of a comparative silver colored pigment exposed to a coating process using a passivating polymer but not a primer polymer.

To form comparative sample 0, only a passivating polymer was used (i.e., no primer polymer was used). A SEM image of comparative sample 0 is shown in FIG. 4. From FIG. 4, it is clear that the aluminum pigment flakes were not passivated with the passivating polymer. This is in sharp contrast to FIGS. 5 and 6A-6B, which are clearly passivated with the passivating polymer. FIG. 4 also illustrates how the aluminum pigment flakes aggregate into clumps when no primer polymer is used.

Each of the samples and comparative samples were tested for flop index and estimated passivation. It is noted that because comparative sample 0 did not result in passivation of the pigment, this comparative sample was not tested for flop index. The tests are discussed below, and the results are shown in Table 2.

TABLE 2

| Sample | Estimated passivation (%) | Flop Index | Method of Milling |
|---|---|---|---|
| Comparative Sample 0 | 0 | N/A | Low-sheer milling (about 100 RPM) difficult to disperse |
| Comparative Sample 1 | Aggregates | 3.3 | Low-shear milling (about 100 RPM) difficult to disperse |
| Comparative Sample 2 | 80% and Aggregates | 3.3 | Low-shear milling (about 100 RPM) difficult to disperse |
| Sample 3 | 75% and Some aggregates | 4.8 | High-shear milling (about 250 RPM) |
| Sample 4 | 60% | 5.0 | High-shear milling (about 250 RPM) |
| Sample 5 | 60% | 8.4 | Low-shear milling (about 100 RPM) |
| Sample 6 | 70% | 8.5 | Low-shear milling (about 100 RPM) |

In this example, the estimated passivation was determined by determining how much of the surface area was covered by the passivating polymer. The percent of surface area that is covered equals the estimated passivation. A higher passivation percent generally indicates that more of the passivation polymer is present on the surface of the sample and comparative silver colored colorant particles. However, the formation of aggregates indicates that the silver colored colorant particles combined to form clumps of the particles. As shown in Table 2, comparative samples 1 and 2, having higher amounts of primer polymer, exhibited increased aggregation. Aggregation of the silver colored colorant may cause the silver colored colorant(s) to have different orientations and may result in an insufficient amount of colorant to cover a desired surface that the LEP ink is printed onto. These factors cause the brilliance of the metallic LEP ink to decrease significantly (as evidence by the decreased flop index for the comparative samples).

The results of Table 2 show that the samples (Samples 4-6) with acrylic polymer and more specifically, formed using a low-shear milling process, had the highest passivation without forming any aggregates and also exhibited the best flop index results. Sample 3, using a desirably low amount of a polyurethane primer polymer, exhibited the formation of some aggregates, but exhibited a better flop index than comparative samples 1 and 2. The slight aggregation of Sample 3 may be due to the polyurethane primer. In comparing samples 3 and 4 (which used the same amount of different types of primer polymer), the slightly better flop index of sample 4 may have been due to the aggregates that formed in sample 3.

Flop index is the measure of the change in lightness of a metallic color as it is tilted through the entire range of viewing angles. Methods for measuring flop index include, for example, illuminating the printed ink containing metallic pigments under $\beta=45°$ and measuring the lightness $L*(\mu_{as})$, for example, at three aspecular angles $\mu_{as}=15°$, $45°$, and $110°$. An equation for calculating flop index (FI) is shown as follows:

$$F1 = 2.69 \cdot \frac{[L*(\mu_{as} = 15°) - L*(\mu_{as} = 110°)]^{1.11}}{[L*(\mu_{as} = 45°)]^{0.85}}$$

Generally, a metallic LEP ink, when printed on a sheet of paper, has a flop index ranging from about 8 to about 12. The higher the flop index, the higher the brilliance of the metallic LEP ink.

In these examples, the flop index was measured using paper coupons obtained with a 0.2% NVS solution of each of the samples and comparative samples 1 and 2 in respective Q/m cells (following identical conditions for each). In a Q/m cell paper coupon, no pressure was applied. The flop index results are shown in Table 2. The results of Table 2 show that the highest flop index was demonstrated by the samples with the acrylic polymer using a low-shear milling process. It is believed that the difference between the highest measured flop index measurements, for samples 5 and 6, was the amount of passivation polymer used. In particular, Sample 6 had a higher wt % content than Sample 5.

In addition to the results shown in Table 2, the flop index of samples 5 and 6 was taken after simulating printing conditions. Printing conditions were simulated by heating and applying pressure with a Teflon roller since heat and pressure are applied when LEP inks are used in a LEP printer. The samples showed a flop index of 10 after simulating printing conditions. This is about a 20% increase in the flop index (over the results in Table 2), and it is expected that sample 4 would exhibit a similar increase when exposed to printing conditions. Based upon these results, it is believed that the metallic LEP ink disclosed herein exhibit a desirably high flop index when printed.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, an amount ranging from about 25 wt % to about 60 wt % should be interpreted to include not only the explicitly recited amount limits of about 25 wt % to about 60 wt %, but also to include individual amounts, such as 27.7 wt %, 31 wt %, etc., and subranges, such as 42 wt % to 55 wt %, etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A coated silver colored colorant, comprising:
   a silver colored pigment;
   a primer polymer at least partially coating the silver colored pigment, the primer polymer having a glass transition temperature that is equal to or less than 40° C.; and
   a passivating polymer attached to the primer polymer, the passivating polymer having a glass transition temperature that is greater than 40° C.,
   wherein the primer polymer is selected from the group consisting of an acrylic styrene emulsion polymer. an acrylic emulsion polymer, and a polyurethane polymer, and
   wherein the passivating polymer is selected from the group consisting of a styrene acrylic emulsion polymer and an acrylic emulsion polymer.

2. The coated silver colored colorant as defined in claim 1 wherein the silver colored pigment maintains its original morphology after the primer polymer and passivating polymer are attached thereto.

3. The coated silver colored colorant as defined in claim 2 wherein the original morphology of the silver colored pigment has a length ranging from about 5 µm to about 10 gm, and wherein the length is maintained after the primer polymer and passivating polymer are attached thereto.

4. The coated silver colored colorant as defined in claim 1 wherein the silver colored pigment is selected from the group consisting of aluminum pigment particles, aluminum pigment flakes, aluminum pigment powders, and combinations thereof.

5. The coated silver colored colorant as defined in claim 1 wherein the primer polymer is a copolymer formed from:
   a first monomer selected from the group consisting of styrene and methyl methacrylate, and present in an amount ranging from about 10 wt % to about 70 wt %;
   a second monomer selected from the group consisting of butyl acrylate, 2-ethylhexyl methacrylate, 2-ethylhexyl acrylate, hexyl acrylate, butyl methacrylate, and lauryl methacrylate, and present in an amount ranging from about 30 wt % to about 90 wt %; and
   a third monomer selected from the group consisting of methacrylic acid and acrylic acid, and present in an amount ranging from about 0 wt % to about 5 wt %.

6. The coated silver colored colorant as defined in claim 1 wherein the passivating polymer is a copolymer formed from:
   styrene present in an amount ranging from about 25 wt % to about 60 wt %;
   methyl methacrylate present in an amount ranging from about 25 wt % to about 60 wt %;
   butyl acrylate present in an amount of about 13 wt %; and
   methacrylic acid present in an amount of about 2 wt %.

7. A metallic base paste, comprising:
a non-polar carrier;
a coated silver colored colorant dispersed in the non-polar carrier, the coated silver colored colorant including:
  a silver colored pigment;
  a primer polymer at least partially coating the silver colored pigment, the primer polymer having a glass transition temperature that is equal to or less than 40° C.; and
  a passivating polymer attached to the primer polymer, the passivating polymer having a glass transition temperature that is greater than 40° C.; and a polymer resin attached to the coated silver colored colorant;
the metallic base paste having a non-volatile solids content ranging from about 20 wt % to about 75 wt%
wherein the primer polymer is selected from the group consisting of an acrylic styrene emulsion polymer. an acrylic emulsion polymer, and a polyurethane polymer, and
wherein the passivating polymer is selected from the group consisting of a styrene acrylic emulsion polymer and an acrylic emulsion polymer.

8. The metallic base paste as defined in claim 7, wherein:
the primer polymer is a copolymer formed from:
  a first monomer selected from the group consisting of styrene and methyl methacrylate, and present in an amount ranging from about 10 wt % to about 70 wt %;
  a second monomer selected from the group consisting of butyl acrylate, 2-ethylhexyl methacrylate, 2-ethylhexyl acrylate, hexyl acrylate, butyl methacrylate, and lauryl methacrylate, and present in an amount ranging from about 30 wt % to about 90 wt %; and
  a third monomer selected from the group consisting of methacrylic acid or acrylic acid, and present in an amount ranging from about 0 wt % to about 5 wt %; and
the passivating polymer is a copolymer formed from:
  styrene present in an amount ranging from about 25 wt % to about 60 wt %;
  methyl methacrylate in an amount ranging from about 25 wt % to about 60 wt %:
  butyl acrylate present in an amount of about 13 wt %; and
  methacrylic acid present in an amount of about 2 wt %.

9. A printable metallic liquid electrophotographic (LEP) ink, comprising:
the coated silver colored colorant of claim 1;
a charge director: and
a non-polar carrier present in an amount such that the metallic LEP ink has a non-volatile solids content ranging from about 0.1 wt % to about 4 wt %.

10. The printable metallic LEP ink as defined in claim 9 wherein:
the silver colored pigment maintains its original length after the primer polymer and passivating polymer are attached thereto; and
the coated silver colored colorant has an increased thickness with respect to an original thickness of the silver colored pigment.

11. The printable metallic LEP ink as defined in claim 9 wherein:
the silver colored pigment is present in an amount ranging from about 20 wt % to about 50 wt % of a total wt % of the coated silver colored colorant; the primer polymer is present in an amount ranging from about 3 wt % to about 20 wt % of a total wt % of the silver colored pigment; and
the passivating polymer is present in an amount ranging from about 30 wt % to about 100 wt % of the total wt % of the silver colored pigment.

12. The printable metallic LEP ink as defined in claim 9 wherein the primer polymer coats at least 60% of a surface of the silver colored pigment.

13. A method of making a metallic base paste, comprising:
forming a mixture of a primer polymer, a silver colored pigment, and water;
low-shear milling the mixture at an ambient temperature, thereby forming a coating of the primer polymer on at least a portion of the silver colored pigment;
adding a passivating polymer to the mixture;
continuing to low-shear mill the mixture at the ambient temperature, thereby attaching the passivating polymer to at least some of the coating of the primer polymer and forming a coated silver colored colorant;
removing the water from the mixture, thereby separating the coated silver colored colorant;
dispersing the coated silver colored colorant in a non-polar carrier to form a dispersion; and
mixing a polymer resin in the dispersion, thereby producing the metallic base paste with a non-volatile solids content ranging from about 20 wt % to about 75 wt %.

14. The method as defined in claim 13, further including adding a predetermined additional amount of non-polar carrier to form a printable metallic liquid electrophotographic (LEP) ink with a non-volatile solids content ranging from about 0.1wt % to about 4 wt %.

* * * * *

UNITED STATES PATENT AND TRADEMARK OFFICE
CERTIFICATE OF CORRECTION

PATENT NO. : 9,914,836 B2
APPLICATION NO. : 15/122596
DATED : March 13, 2018
INVENTOR(S) : Sivapackia Ganapathiappan et al.

It is certified that error appears in the above-identified patent and that said Letters Patent is hereby corrected as shown below:

In Column 16, Line 25, in Claim 1, delete "polymer." and insert -- polymer, --, therefor.

In Column 16, Line 39, in Claim 3, delete "gm" and insert -- μm --, therefor.

In Column 17, Line 16, in Claim 7, delete "75 wt%" and insert -- 75 wt%, --, therefor.

In Column 17, Line 18, in Claim 7, delete "polymer." and insert -- polymer, --, therefor.

In Column 17, Line 43, in Claim 8, delete "60 wt %:" and insert -- 60 wt %; --, therefor.

In Column 17, Line 50, in Claim 9, delete "director:" and insert -- director; --, therefor.

Signed and Sealed this
Twenty-eighth Day of August, 2018

Andrei Iancu
*Director of the United States Patent and Trademark Office*